United States Patent

Enokida et al.

Patent Number: 5,994,487
Date of Patent: *Nov. 30, 1999

[54] FLUOROELASTOMER AND ITS CROSS-LINKABLE COMPOSITION

[75] Inventors: Takashi Enokida, Kitaibaraki; Shinichi Sonobe, Iwaki; Haruyoshi Tatsu, Hitachi, all of Japan

[73] Assignee: Nippon Mektron, Limited, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/733,243

[22] Filed: Oct. 2, 1996

[30] Foreign Application Priority Data

Oct. 13, 1995 [JP] Japan .................................. 7-291728

[51] Int. Cl.$^6$ ...................................................... C08F 16/24
[52] U.S. Cl. ........................................... 526/247; 526/255
[58] Field of Search ...................................... 526/247, 255

[56] References Cited

U.S. PATENT DOCUMENTS

| | | | |
|---|---|---|---|
| 3,449,305 | 6/1969 | Stilmer | 526/247 |
| 3,645,991 | 2/1972 | Aversasian | 526/247 |
| 4,123,603 | 10/1978 | Stewart, Jr. | |
| 4,745,165 | 5/1988 | Arcella et al. | |
| 5,260,392 | 11/1993 | Arcella et al. | 526/247 |
| 5,260,393 | 11/1993 | Arcella et al. | 526/247 |
| 5,354,824 | 10/1994 | Arcella et al. | 526/247 |
| 5,585,449 | 12/1996 | Arcella et al. | 526/247 |

FOREIGN PATENT DOCUMENTS

| | | | |
|---|---|---|---|
| 0525687 | 2/1993 | European Pat. Off. | 526/247 |
| 2347389 | 12/1977 | France | 526/247 |
| 53-4035 | 2/1978 | Japan . | |
| 62-1965 | 1/1987 | Japan . | |
| 6-49138 | 2/1994 | Japan . | |
| 6-128334 | 5/1994 | Japan . | |
| 6-145252 | 5/1994 | Japan . | |
| 0953152 | 3/1964 | United Kingdom | 526/247 |

OTHER PUBLICATIONS

Official Gazette 1046 TMOG 2, Sep. 4, 1984.

*Primary Examiner*—Bernard Lipman
*Assistant Examiner*—N. Sarafin
*Attorney, Agent, or Firm*—Kenyon & Kenyon

[57] ABSTRACT

A fluoroelastomer comprising 74 to 80% by mole of vinylidene fluoride, 4 to 12% by mole of tetrafluoroethylene, 14 to 18% by mole of hexafluoropropene and 0.3 to 1.3% by mole of perfluoro(alkyl vinyl ether), the sum total being 100% by mole, gives vulcanization products having well balanced high levels of low-temperature characteristics and methanol resistance, and suppressed change in the hardness with time after the secondary vulcanization.

4 Claims, No Drawings

FLUOROELASTOMER AND ITS CROSS-LINKABLE COMPOSITION

BACKGROUND OF THE INVENTION

1. Field of the Invention

The present invention relates to a fluoroelastomer and its cross-linkable composition and more particularly to a fluoroelastomer capable of producing vulcanization products having distinguished low-temperature characteristics and methanol resistance, and its vulcanizable composition.

2. Related Prior Art (1) An elastomeric terpolymer comprising 57 to 61% by weight (71.1 to 76.0% by mole) of vinylidene fluoride, 10 to 14% by weight (13.5 to 17.9% by mole) of tetrafluoroethylene and 27 to 31% by weight (8.1 to 11.6% by mole) of hexafluoropropene, the sum total being 100% by weight (or by mole), disclosed in JP-B-62-1965 (U.S. Pat. No. 4,123,603), produces vulcanization products having a low glass transition temperature (Tg), a low compression set at low temperature and low pressure, and also a good methanol resistance, but have no satisfactory level of low-temperature characteristics (TR-10) yet. The elastomeric terpolymer has a low vulcanization speed with a polyol-based cross-linking agent. Thus, injection molding, etc. cannot be effectively used for the elastomeric terpolymer.

(2) A fluoroelastomer comprising 60.5 to 64% by weight (76.6 to 79.4% by mole) of vinylidene fluoride, 5 to 8% by weight (4.0 to 6.5% by mole) of tetrafluoroethylene and 30 to 33% by weight (15.0 to 17.4% by mole) of hexafluoropropene, the sum total being 100% by weight (or by mole), disclosed in JP-A-6-49138 (Italian Patent Application No. 41,003A/90), discloses its vulcanization products having not only the similar low-temperature characteristics to those of the vulcanization products from the elastomeric terpolymer (1), but also a lower TR (temperature contraction) value and a lower degree of crystallization and furthermore a higher vulcanization speed than that of the vulcanization products from the elastomeric terpolymer (1). But, as the vulcanization products from the fluoroelastomer (2) has a poor methanol resistance, its applications are limited. To overcome the poor methanol resistance by adjusting the vulcanizable composition with some additives, i.e. a filler, a mixing ratio of the filler must be increased, resulting in an increase in the hardness of vulcanization products. Its applications are likewise limited.

As to the low-temperature characteristics to be good, TR-70 is still below the satisfactory level. To improve TR-70 within the said composition range of the fluoroelastomer, it would be effective to increase the proportion of hexafluoropropene, but the increase of hexafluoropropene would inevitably deteriorate a TR-10 value of vulcanization products. That is, it is difficult to maintain a good balance between physical properties. As to the hardness of vulcanization products, the hardness tends to unfavorably increase with time in the said composition range of the fluoroelastomer.

(3) A fluoroelastomeric copolymer comprising 48 to 65% by weight (64.7 to 81.4% by mole) of vinylidene fluoride, 0 to 17% by weight (0 to 15% by mole) of tetrafluoroethylene, 21 to 36% by weight (10.8 to 21.9% by mole) of hexafluoropropene and 3 to 9% by weight (1.4 to 4.9% by mole) of perfluoro(alkyl vinyl ether), the sum total being 100% by weight (or by mole), where "% by mole" shows proportions of individual comonomers, when perfluoro(methyl vinyl ether) is used as perfluoro(alkyl vinyl ether), disclosed in JP-A-6-128334, is directed to improvement of the low-temperature characteristics of vulcanization products from the said fluoroelastomer (2), where a portion of hexafluoropropene of the fluoroelastomer (2) is replaced with about 8% by weight (about 4% by mole) of perfluoro(methyl vinyl ether) in the said composition range of the fluoroelastomeric copolymer (2), whereby the TR-10 value of the vulcanization products was inproved by 3° C., as shown in Tables 3 and 4.

However, the fluoroelastomeric copolymer within the above-mentioned composition range has a low vulcanization speed with a polyol-based cross-linking agent. To obtain a practical vulcanization speed, the mixing ratio of a vulcanization promoter must be increased, resulting in an increase in the vulcanization minimum torque. Injection molding thus will be unfavorable.

(4) A fluoroelastomeric copolymer comprising 30 to 47% by weight (45.4 to 67.5% by mole) of vinylidene fluoride, 10 to 30% by weight (8.9 to 29.4% by mole) of tetrafluoroethylene, 18 to 40% by weight (11.2 to 27.9% by mole) of hexafluoropropene and 3 to 20% by weight (1.5 to 11.7% by mole) of perfluoro(alkyl vinyl ether), the sum total being 100% by weight (or by mole), where "% by mole" shows proportions of individual comonomers, when perfluoro(methyl vinyl ether) is used as perfluoro(alkyl vinyl ether), disclosed in JP-A-6- 145252, is suitable for the production of shaft seals and fuel hoses in contact with motor oil or gasoline containing an alcohol, particularly methanol, but its vulcanization products have low-temperature characteristics, for example a TR-10 value as low as −13 to −16.5° C. Thus, the service temperature will be limited.

(5) A fluoroelastomer comprising 48 to 65% by weight (66. 1 to 87.0% by mole) of vinylidene fluoride, 4 to 15% by weight (2.2 to 13.3% by mole) of tetrafluoroethylene, 8 to 23% by weight (2.9 to 13.9% by mole) of hexafluoropropene and 17 to 30% by weight (5.6 to 16.1% by mole) of perfluoro(alkyl vinyl ether), the sum total being 100% by weight (or by mole), where "% by mole" shows proportions of individual comonomers, when perfluoro(methyl vinyl ether) is used as perfluoro(alkyl vinyl ether), disclosed in JP-B-53-4035, shows that the vulcanization products have good low-temperature characteristics, but its Examples show the fluoroelastomer has a low vulcanization speed, that is, requirements of 168° C. for 20 minutes (Example 5) or 177° C. for 15 minutes (Example 7) for the primary vulcanization and further requirements of long time for the post-curing. Thus, injection molding will be difficult to conduct.

SUMMARY OF THE INVENTION

An object of the present invention is to provide a fluoroelastomer comprising vinylidene fluoride, tetrafluoroethylene, hexafluoropropene and perfluoro(alkyl vinyl ether), capable of producing vulcanization products having well balanced, high levels of low-temperature characteristics and methanol resistance, and a well controlled hardness change after the secondary vulcanization.

According to the present invention, there is provided a fluoroelastomer comprising 74 to 80% by mole of vinylidene fluoride, 4 to 12% by mole of tetrafluoroethylene, 14 to 18% by mole of hexafluoropropene and 0.3 to 1.3% by mole of perfluoro(alkyl vinyl ether), the sum total being 100% by mole.

DETAILED DESCRIPTION OF THE INVENTION

Vinylidene fluoride (VDF) is copolymerized in the proportion of 74 to 80% by mole (56.9 to 65.3% by weight), preferably 76.5 to 78% by mole (59.9 to 62.4% by weight). Below 74% by mole, the low-temperature characteristics of the resulting vulcanization products will be deteriorated, whereas above 80% by mole, the methanol resistance of the resulting vulcanization products will be lowered.

Tetrafluoroethylene (TFE) is copolymerized in the proportion of 4 to 12% by mole (4.9 to 14.9% by weight), preferably 5 to 7% by mole (6.1 to 8.7% by weight). Below 4% by mole, the proportion of vinylidene fluoride or hexafluoropropene will be increased consequently, and the methanol resistance of the resulting vulcanization products will be lowered with increasing proportion of vinylidene fluoride, whereas the low-temperature characteristics of the resulting vulcanization products will be deteriorated with increasing proportion of hexafluoropropene. Above 12% by mole, the proportion of vinylidene fluoride or hexafluoropropene is decreased consequently, and the low-temperature characteristics of the resulting vulcanization products will be deteriorated and the vulcanization speed will be slower with decreasing the proportion of vinylidene fluoride, whereas changes in the hardness with time and deterioration of the low-temperature characteristics (TR-70) of the resulting vulcanization products will appear and the vulcanization speed will be lower with decreasing the proportion of hexafluoropropene.

Hexafluoropropene [HFP] is copolymerized in the proportion of 14 to 18% by mole (23.6 to 32.7% by weight), preferably 15.5 to 17% by mole (28.7 to 31.5% by weight). Below 14% by mole, an increase in the hardness, changes in the hardness with time and the deterioration of the low-temperature characteristics (TR-70) of the resulting vulcanization products will appear and the vulcanization speed will be lowered, whereas above 18% by mole, the low-temperature characteristics (TR-10) of the resulting vulcanization products will be deteriorated.

Perfluoro(alkyl vinyl ether) [PAVE] is copolymerized in the proportion of 0.3 to 1.3% by mole (0.6 to 2.7% by weight), preferably 0.5 to 1.2% by mole (1 to 2.5% by weight). As perfluoro(alkyl vinyl ether), perfluoro(methyl vinyl ether), perfluoro(ethyl vinyl ether), perfluoro(propyl vinyl ether), etc. can be used. Preferable is perfluoro(methyl vinyl ether). "% by weight" in parentheses following "% by mole" of the individual comonomers shows proportions of the individual componomers, when perfluoro(methyl vinyl ether) was used as perfluoro(alkyl vinyl ether).

The proportion range of perfluoro(alkyl vinyl ether) is selected to attain the desired object of the present invention. Above 1.3% by mole, the vulcanization speed with a polyol-based cross-linking agent will be lower, and also since perfluoro(alkyl vinyl ether) is generally expensive, lowering of its proportion in the copolymer composition is highly acceptable from the viewpoint of cost.

Copolymerization reaction of these comonomers can be carried out by suspension polymerization, solution polymerization, etc. Preferable is emulsion polymerization.

In case of suspension polymerization, polymerization reaction of comonomers is carried out while maintaining then in suspension in water, using a polymerization initiator such as an organic peroxide, a fluorine-containing organic peroxide, an organic azo compound, a fluorine-containing organic azo compound, etc. directly or in solution in a solvent such as trifluorotrichloroethane, methyl chloroform, dichlorotetrafluoroethane, difluorotetrachloroethane, etc.

In case of solution polymerization, polymerization reaction is carried out in a polymerization solvent with less chain transferability, such as perfluoro(1,2-dimethylcyclobutane), perfluoro(1,2-dichloroethane), perfluoro(1,2,2-trichloroethane), perfluorocyclohexane, perfluorotributylamine, $\alpha,\omega$-dihydroperfluoropolymethylene, perfluoro(methoxypolyethoxyethane), perfluorocyclobutane, t-butanol, etc., using a polymerization initiator such as organic peroxide, a fluorine-containing organic peroxide, an organic azo compound, a fluorine-containing organic azo compound, etc.

In case of emulsion polymerization, a water-soluble polymerization initiator such as an inorganic peroxide, for example, persulfates, hydrogen peroxide, perchlorates, etc., or an organic peroxide, for example, t-butyl hydroperoxide, disuccinyl peroxide, etc. An inorganic peroxide can be also used as a redox system together with a reducing agent such as sulfites, hyposulfites, ascorbic acid, etc. To attain stable dispersion of polymer particles in the polymerization solution, an increase in the polymer concentration and prevention of polymers from deposition onto the polymerization reactor, an emusifying agent such as fluorine-containing carboxylates, fluorine-containing sulfonates, etc. can be also used. Furthermore, a chain transfer agent such as ethyl acetate, diethyl malonate, etc. can be used, as desired.

The present fluoroelastomer has a Mooney viscosity $ML_{1+10}$ (121° C.) of about 20 to about 100 points, preferably about 30 to about 80 points, and can be cured according to various, so far well known vulcanization methods, for example, a peroxide vulcanization method using an organic peroxide, a polyamine vulcanization method using a polyamine compound, a polyol vulcanization method using a polyhydroxy compound, or an irradiation method using radiations, electron beams, etc. Above all, a vulcanization method using a polyol-based cross-linking agent is particularly preferable, because the resulting cured elastomer can produce vulcanization products having distinguished compression set characteristics, etc.

Cross-linking agents for polyol vulcanization includes, for example, polyhydroxy aromatic compounds such as 2,2-bis(4-hydroxyphenyl)propane [bisphenol A], 2,2-bis(4-hydroxyphenyl)perfluoropropane [bisphenol AF], hydroquinone, catechol, resorcinol, 4,4'-dihydroxydiphenyl, 4,4'-dihydroxydiphenylmethane, 4,4'-dihydroxydiphenylsulfone, 2,2-bis(4-hydroxyphenyl)butane, etc. or their alkali metal salts or alkaline earth metal salts. About 0.5 to about 10 part by weight, preferably about 1 to about 5 parts by weight, of the cross-linking agent can be used per 100 parts by weight of fluoroelastomer.

When a polyhydroxy aromatic compound or its metal salt is used as a cross-linking agent, it is preferable to use about 0.1 to about 10 parts by weight, preferably about 0.1 to about 2 parts by weight, of a cross-linking promoter such as various quaternary ammonium salts and quaternary phosphonium salts per 100 parts by weight of fluoroelastomer. Furthermore, about 1 to about 20 parts by weight, preferably about 3 to about 15 parts by weight, of an acid acceptor such as various divalent metal oxides or hydroxides can be used per 100 parts by weight of fluoroelastomer.

The above-mentioned components for the vulcanization system can be added to and kneaded with the fluoroelastomer directly or after diluted with carbon black, silica, clay, talc, diatomaceous earth, barium sulfate, etc. or as a master batch dispersion with the fluoroelastomer. Besides the above-mentioned components, the composition for the vulcanization can further contain so far well known fillers or reinforcing agents such as carbon black, silica, graphite, clay, talc, diatomaceous earth, barium sulfate, titanium oxide, wollastonite, etc., a plasticizer, a lubricant, a processing aid, pigments, etc., as desired.

Vulcanization can be carried out by heating, after the above-mentioned components are mixed according to the ordinary mixing method, for example, by roll mixing, kneader mixing, Bambury mixing, solution mixing, etc. Heating is usually carried out at a temperature of about 100 to about 250 C. for about 1 to about 120 minutes for primary vulcanization and at a temperature of about 150 to about 300° C. for 0 to about 30 hours for secondary vulcanization. Even injection molding can be used.

The present fluoroelastomer can produce vulcanization products having improved low-temperature characteristics (TR-70), a decrease in the hardness, suppressed changes in the hardness with time and an improved methanol resistance at the same time without lowering the vulcanization speed, when vulcanized with a polyol-based cross-linking agent, by properly selecting a copolymer composition range for vinylidene fluoride, tetrafluoroethylene and hexafluoropropene, and further by copolymerizing a small proportion of perfluoro (alkyl vinyl ether) with the above-mentioned comonomers.

PREFERRED EMBODIMENTS OF THE INVENTION

The present invention will be described in detail below, referring to Examples and Comparative Examples.

EXAMPLE 1

6 liters of deionized water, 2 g of ammonium perfluorooctanoate and 2 g of sodium hydroxide were charged into an autoclave having a net capacity of 10 liters, followed by complete replacement of the autoclave atmosphere with a nitrogen gas. Then, a mixed gas consisting of the following compounds was charged under pressure into the autoclave as an initial charge gas until the autoclave inside pressure reached 24 kgf/cm$^2$ gauge:

| | |
|---|---|
| Vinylidene fluoride [VDF] | 71.0% by mole |
| Tetrafluoroethylene [TFE] | 5.5% by mole |
| Hexafluoropropene [HFP] | 22.0% by mole |

Perfluoro(methyl vinyl ether) [FMVE] 1.5% by mole Then, 10 g of diethyl malonate was charged under pressure into the autoclave, and the autoclave was heated to an inside temperature of 80° C.

Then, an aqueous polymerization initiator solution consisting of 5 g of ammonium persulfate in 150 g of water was charged under pressure into the autoclave to start polymerization reaction. When the autoclave inside pressure was lowered to 29 kgf/cm$^2$ gauge, a mixed gas of VDF/TFE/HFP in a molar ratio of 77.9/6.0/16.1 was charged under pressure into the autoclave as a supplementary gas until the autoclave inside pressure reached 30 kgf/cm$^2$ gauge. Whenever the autoclave inside pressure was lowered to 29 kgf/cm$^2$ gauge, the above supplementary gas was repeatedly charged under pressure into the autoclave until the autoclave inside pressure reached 30 kgf/cm$^2$ gauge. 3 hours after the first supplemental addition of the supplementary gas after the start of polymerization reaction, supplemental addition of the supplementary gas was finished, and then the unreacted gases were immediately purged from the autoclave to stop the reaction. An aqueous 5% potassium alum solution was added to the resulting aqueous emulsion to coagulate the formed copolymers. The coagulates were recovered therefrom, washed with water and dried, whereby 2650 g of fluoroelastomer was obtained.

The following components were roll-kneaded and the resulting kneaded mixture was press-vulcanized at 180° C. for 10 minutes (primary vulcanization) and then oven-vulcanized at 230° C. for 22 hours (secondary vulcanization) to vulcanization mold sheets and O-rings:

| | Parts by weight |
|---|---|
| The resulting fluoroelastomer | 100 |
| Bisphenol AF master batch (50 wt.%) | 4 |
| Benzyltriphenylphosphonium chloride master batch (35 wt.%) | 1.5 |
| Magnesium oxide | 3 |
| Calcium hydroxide | 6 |
| Arstin black | 25 |
| Silica (Aerosil R972, trademark of Nihon Aerosil Co., Japan) | 10 |
| Iron oxide red (Brown 401, trademark of Letz Color Co., Japan) | 5 |

Note: Master batches are those with the fluoroelastomer

The fluoroelastomer and vulcanization products were subjected to measurement of the following items:
  Copolymer composition (% by mole and % by weight): by $^{19}$F-NMR
  Copolymer Mooney viscosity ML$_{1+10}$ (121° C.): according to ASTM D-1646-82
  ODR: Minimum torque (M$_L$), maximum torque (M$_H$) and time (Tc 90) reaching to a value of 90% of the maximum torque was attained were measured in the vulcanization process at 180° C. for 10 minutes, using an oscillating disc rheometer, type ASTM-100, made by Toyo Seiki K. K., Japan.
  Normal state physical properties:
    Hardness (Shore A): according to ASTM D-2240-81
    Hardness (IRHD): according to ASTM D-2240-81
    100% modulus: according to ASTM D-412-83
    Tensile strength: according to ASTM D-412-83
    Elongation: according to ASTM D-412-83
  Change in the hardness: calculated from a difference between the hardness just after the secondary vulcanization and that of 7 days thereafter.
  Methanol resistance: percent volumic change when a test piece was dipped in methanol at 60° C. for 70 hours (which serves as a common indicator of the resistance to organic solvents)
  Low-temperature characteristics: by TR test according to ASTM D-1329
  Compression set: O-rings, 3.5 mm in wire diameter, when subjected to 25% compression at 200° C. for 70 hours, were subjected to measurement as test pieces

EXAMPLE 2 AND COMPARATIVE EXAMPLES 1 TO 4

In Example 1, copolymerization reaction was carried out by changing the initial charge gas composition and the supplementary gas composition to those as given in the following Table, and the resulting fluoroelastomers and their vulcanization products were subjected to the same measurement as in Example 1.

Results of measurements in Examples 1 and 2 and Comparative Examples 1 to 4 are given in the following Table together with the initial charge gas compositions and supplementary gas compositions:

TABLE

| | Example | | Comparative Example | | | |
|---|---|---|---|---|---|---|
| | 1 | 2 | 1 | 2 | 3 | 4 |
| [Initial charge gas composition] | | | | | | |
| VDF (mol.%) | 71.0 | 69.6 | 72.0 | 71.0 | 68.0 | 69.5 |
| TFE (mol.%) | 5.5 | 4.8 | 6.0 | 5.0 | 4.0 | 8.5 |
| HFP (mol.%) | 22.0 | 22.0 | 22.0 | 24.0 | 22.0 | 22.0 |
| FMVE (mol.%) | 1.5 | 3.6 | | | 6.0 | |
| [Supplementary gas composition] | | | | | | |
| VDF (mol.%) | 77.9 | 78.4 | 77.5 | 77.5 | 79.1 | 74.7 |
| TFE (mol.%) | 6.0 | 5.4 | 6.5 | 5.5 | 4.6 | 9.1 |
| HFP (mol.%) | 16.1 | 16.2 | 16.0 | 17.0 | 16.3 | 16.2 |
| [Copolymer composition] | | | | | | |
| VDF (mol.%) | 77.5 | 77.5 | 77.5 | 77.5 | 77.5 | 74.7 |
| TFE (mol.%) | 6.0 | 5.3 | 6.5 | 5.5 | 4.5 | 9.1 |
| HFP (mol.%) | 16.0 | 16.0 | 16.0 | 17.0 | 16.0 | 16.2 |
| FMVE (mol.%) | 0.5 | 1.2 | | | 2.0 | |
| [Copolymer composition] | | | | | | |
| VDF (wt.%) | 61.7 | 61.3 | 61.9 | 60.8 | 60.9 | 58.9 |
| TFE (wt.%) | 7.5 | 6.5 | 8.1 | 8.0 | 5.5 | 11.2 |
| HFP (wt.%) | 29.8 | 29.7 | 30.0 | 31.2 | 29.5 | 29.9 |
| FMVE (wt.%) | 1.0 | 2.5 | | | 4.1 | |
| [Copolymer viscosity] | | | | | | |
| $ML_{1+10}$ (121° C.) (pts) | 45 | 47 | 44 | 43 | 44 | 46 |
| [ODR] | | | | | | |
| $M_L$ (kg · cm) | 9.1 | 9.3 | 9.0 | 9.1 | 9.1 | 9.2 |
| $M_H$ (kg · cm) | 60.4 | 60.7 | 60.0 | 59.9 | 60.4 | 60.8 |
| Tc 90 (sec.) | 239 | 237 | 234 | 228 | 254 | 249 |
| [Normal state physical properties] | | | | | | |
| Hardness (Shore A) (points) | 79 | 78 | 81 | 79 | 78 | 83 |
| Hardness (IRHD) (points) | 80 | 79 | 83 | 80 | 78 | 85 |
| 100% modulus (MPa) | 9.6 | 9.3 | 9.5 | 9.8 | 9.0 | 8.8 |
| Tensile strength (MPa) | 14.2 | 14.5 | 14.0 | 14.1 | 13.8 | 14.0 |
| Elongation (%) | 170 | 180 | 170 | 160 | 180 | 170 |
| [Change in the hardness] | | | | | | |
| Shore A (points) | ±0 | ±0 | ±0 | ±0 | ±0 | ±0 |
| IRHD (points) | +1 | ±0 | +4 | ±0 | ±0 | +2 |
| [Methanol resistance] | | | | | | |
| Percent volumic change (%) | +58 | +57 | +67 | +64 | +56 | +52 |
| [Low-temperature characteristics] | | | | | | |
| TR-10 (°C.) | −20.0 | −20.4 | −19.0 | −18.3 | −21.0 | −17.3 |
| TR-50 (°C.) | −9.2 | −11.5 | −8.8 | −9.7 | −12.5 | −5.4 |
| TR-70 (°C.) | −2.0 | −4.5 | +2.0 | −0.5 | −5.0 | +4.0 |
| (TR-10)–(TR-70) (°C.) | 18.0 | 15.8 | 21.0 | 17.8 | 16.0 | 21.3 |
| [Compression set] | | | | | | |
| 200° C. for 70 hours (%) | 28 | 28 | 28 | 27 | 30 | 30 |

It is apparent from the foregoing results that:

(1) Lowering of hardness: In Examples 1 and 2, where a portion of TFE in the copolymer composition of Comparative Example 1 were replaced with 0.5 mol. % FMVE or 1.2 mol. % FMVE, respectively, the hardness was lowered by 2 to 3 points in Shore A and by 3 to 4 points in IRHD, whereas in Comparative Example 2, where a portion of TFE in the copolymer composition of Comparative Example 1 was replaced with 1 mol. % HFP, lowering of hardness is observable, but deterioration of the low-temperature characteristics (TR-10) is inevitable.

(2) Suppression of changes in the hardness with time: Apparent from comparison of Examples 1 and 2 with Comparative Examples 1 and 2.

(3) Methanol resistance: Apparent from comparison of Examples 1 and 2 with Comparative Examples 1 and 2. In Comparative Example 4, where a portion of VDF in the copolymer composition of Comparative Example 1 was replaced with 3.5 mol. % TFE, the low-temperature characteristics (TR-10)were deteriorated in exchange with increase in the methanol resistance.

(4) Improvement of low-temperature characteristics: In Examples 1 and 2, where a portion of TFE in the copolymer composition of Comparative Example 1 were replaced with 0.5 mol. % FMVE or 1.2 mol. % FMVE, respectively, TR-10 is improved by 1 to 1.4° C. and TR-70 by 4 to 6.5° C. On the other hand, in Comparative Example 2, where a portion of TFE in the copolymer composition of Comparative Example 1 was replaced with 1 mol. % HFP, TR-70 is improved by 2.5° C., but TR-10 is deteriorated by 0.7° C. In Comparative Example 3 using 2.0 mol. % FMVE in the copolymer composition, TR-10 is further improved by 0.6° C., as compared with Example 2, but TR-70 is improved only by 0.5° C. and the compression set is deteriorated and also the vulcanization speed (Tc 90) is appreciably deteriorated.

(5) Improvement of vulcanization speed: Apparent from comparison of Examples 1 and 2 with Comparative Examples 3 and 4. Injection moldability is improved by an improvement of Tc 90 value correspondingly.

What is claimed is:

1. A fluoroelastomer, consisting of 74 to 80% by mole of vinylidene fluoride, 4 to 12% by mole of tetrafluoroethylene, 14 to 18% by mole of hexafluoropropene and 0.3 to 1.2% by mole (0.6–2.5% by weight) of perfluoro(methyl vinyl ether) sum total being 100% by mole.

2. A fluoroelastomer, consisting of 76.5 to 78% by mole of vinylidene fluoride, 5 to 7% by mole of tetrafluoroethylene, 15.7 to 17% by mole of hexafluoropropene and 0.5 to 1.2% by mole of perfluoro(methyl vinyl ether), the sum total being 100% by mole.

3. A fluoroelastomer according to claim 1, wherein the copolymer has a Mooney viscosity $ML_{1+10}$ (121° C.) of about 20 to about 100 points.

4. A fluoroelastomer according to claim 1, wherein the copolymer has a Mooney viscosity $ML_{1+10}$ (121° C.) of about 30 to about 80 points.

* * * * *

UNITED STATES PATENT AND TRADEMARK OFFICE
CERTIFICATE OF CORRECTION

PATENT NO. : 5,994,487

DATED : November 30, 1999

INVENTOR(S) : ENOKIDA et al.

It is certified that error appears in the above-identified patent and that said Letters Patent is hereby corrected as shown below:

ON THE TITLE PAGE

Item [57] Abstract, line 3, change "1.3%" to -- 1.2% --;

Item [57] Abstract, line 4, change "alkyl" to -- methyl --;

Column 3, line 63, change "methyl chloroform" to -- methylchloroform --; and

Column 8, line 48, before "sum" insert -- the --.

Signed and Sealed this

Eighth Day of May, 2001

Attest:

NICHOLAS P. GODICI

*Attesting Officer*    *Acting Director of the United States Patent and Trademark Office*